(12) United States Patent
Karlsson et al.

(10) Patent No.: US 9,222,396 B2
(45) Date of Patent: Dec. 29, 2015

(54) METHOD AND SYSTEM FOR EXHAUST CLEANING

(75) Inventors: Carl-Johan Karlsson, Strömstad (SE); Klas Telborn, Södertälje (SE)

(73) Assignee: SCANIA CV AB (SE)

( * ) Notice: Subject to any disclaimer, the term of this patent is extended or adjusted under 35 U.S.C. 154(b) by 289 days.

(21) Appl. No.: 13/818,318

(22) PCT Filed: Aug. 24, 2011

(86) PCT No.: PCT/SE2011/051016
§ 371 (c)(1),
(2), (4) Date: Feb. 22, 2013

(87) PCT Pub. No.: WO2012/030279
PCT Pub. Date: Mar. 8, 2012

(65) Prior Publication Data
US 2013/0145822 A1   Jun. 13, 2013

(30) Foreign Application Priority Data

Aug. 31, 2010  (SE) ..................................... 1050891

(51) Int. Cl.
| | |
|---|---|
| *F01N 11/00* | (2006.01) |
| *F01N 9/00* | (2006.01) |
| *F01N 13/00* | (2010.01) |
| *F01N 3/10* | (2006.01) |

(52) U.S. Cl.
CPC ................ *F01N 11/00* (2013.01); *F01N 9/002* (2013.01); *F01N 13/0097* (2014.06); *F01N 3/106* (2013.01); *F01N 2560/08* (2013.01); *F01N 2570/22* (2013.01); *F01N 2900/1404* (2013.01); *F01N 2900/1406* (2013.01); *F01N 2900/1606* (2013.01); *F02D 2200/0812* (2013.01); *Y02T 10/47* (2013.01)

(58) Field of Classification Search
CPC ........................................................ F01N 11/00
See application file for complete search history.

(56) References Cited

U.S. PATENT DOCUMENTS

| | | | | |
|---|---|---|---|---|
| 4,656,832 | A * | 4/1987 | Yukihisa et al. | 73/28.01 |
| 2003/0154710 | A1 | 8/2003 | Plote et al. | 60/277 |
| 2009/0044514 | A1 | 2/2009 | Brahma et al. | 60/274 |
| 2009/0199544 | A1 | 8/2009 | Etcheverry et al. | 60/294 |
| 2010/0313629 | A1 | 12/2010 | Singh | 73/23.31 |
| 2012/0291628 | A1 * | 11/2012 | Seo et al. | 95/18 |

FOREIGN PATENT DOCUMENTS

| | | |
|---|---|---|
| EP | 1 854 971 | 11/2007 |
| GB | 2 456 060 | 7/2009 |

OTHER PUBLICATIONS

International Search Report mailed Nov. 24, 2011 in corresponding PCT International Application No. PCT/SE2011/051016.

* cited by examiner

*Primary Examiner* — Laura Martin
*Assistant Examiner* — Alex Devito
(74) *Attorney, Agent, or Firm* — Ostrolenk Faber LLP

(57) ABSTRACT

A method and a system for estimation of a soot load in a particle filter in an exhaust cleaning system, which estimation involves using a pressure drop across said particle filter in order to determine the soot load. Measurement of the pressure drop across the particle filter and therefore the estimation have to take place at a time when an exhaust mass flow of the exhaust cleaning system exceeds a flow threshold value, the particle filter is substantially free from water and a temperature of the particle filter exceeds a first threshold value. The result is a robust estimate of the soot load in the particle filter.

22 Claims, 5 Drawing Sheets

METHOD AND SYSTEM FOR EXHAUST CLEANING

CROSS-REFERENCE TO RELATED APPLICATIONS

The present application is a 35 U.S.C. §§371 national phase conversion of PCT/SE2011/051016, filed Aug. 24, 2011, which claims priority of Swedish Application No. 1050891-9, filed Aug. 31, 2010, the contents of which are incorporated by reference herein. The PCT International Application was published in the English language.

FIELD OF THE INVENTION

The present invention relates to particle filters and in particular to a method for estimation of a soot load in a particle filter. The invention relates also to a system configured to making an estimate of a soot load in a particle filter. The invention relates also to a computer programme for applying the method and to a vehicle which is provided with the system.

BACKGROUND TO THE INVENTION

Growing official concern about pollution and air quality, especially in urban areas, has led to the adoption of emission standards and rules in many jurisdictions.

Such emission standards often set requirements which define acceptable limits for exhaust discharges from vehicles equipped with combustion engines. These standards often regulate, for example, levels of discharge of nitrogen oxides ($NO_x$), hydrocarbons (HC), carbon monoxide (CO) and particles from most types of vehicles.

The endeavour to meet such emission standards has led to ongoing research with a view to reducing emissions by means of post-treatment (cleaning) of the exhaust gases which arise from combustion in a combustion engine.

One way to post-treat exhaust gases from a combustion engine is a so-called catalytic cleaning process, so vehicles and many other at least large means of transport powered by combustion engines are usually also provided with at least one catalyst.

Post-treatment systems may also, either alternatively or in combination with one or more catalysts, comprise other components, e.g. particle filters. There are also cases where particle filters and catalysts are integrated with one another.

Combustion in the cylinders of a combustion engine results in the formation of soot particles. Particle filters are used to capture these soot particles, and work in such a way that the exhaust flow is led through a filter structure whereby soot particles are captured from the passing exhaust flow and are stored in the particle filter.

The particle filter fills with soot progressively during vehicle operation, and has sooner or later to be emptied of it, which is usually achieved by so-called regeneration.

Regeneration involves the soot particles, which mainly consist of carbon particles, being converted to carbon dioxide and/or carbon monoxide in one or more chemical processes, which regeneration may in principle be effected in two different ways. One way is regeneration by so-called oxygen ($O_2$) based regeneration, also called active regeneration. In active regeneration, fuel is added to the exhaust gases and is intended to burn up in an oxidation catalyst situated upstream from the particle filter. In active regeneration, carbon is converted by oxygen to carbon dioxide and water.

This chemical reaction requires relatively high particle filter temperatures for desired reaction rates (filter emptying rates) to be achieved at all.

Instead of active regeneration, it is possible to apply $NO_2$ based regeneration, also called passive regeneration. In passive regeneration, nitrogen oxides and carbon oxides are formed by a reaction between carbon and nitrogen dioxide. The advantage of passive regeneration is that desired reaction rates, and hence the rate at which the filter is emptied, can be achieved at significantly lower temperatures.

As described below a differential pressure across the particle filter, i.e. a pressure drop across the filter, is used to determine the soot load in the filter. This pressure drop is then used as a basis for deciding when a regeneration has to be done. However, measurements of the differential pressure across the particle filter are subject to a number of sources of error, with the result that previous known estimates of the soot load become incorrect.

This may lead to regeneration being effected at non-optimum times such that the vehicle runs with unnecessarily high backpressure in the particle filter, resulting in increased fuel consumption. Alternatively, regeneration at non-optimum times leads to it being effected too often, likewise causing greater fuel consumption.

SUMMARY OF THE INVENTION

An object of the present invention is to propose a method for estimating a soot load in a particle filter. This object is achieved by the method of the invention. The object is also achieved by the system according to the invention. This object is also achieved by a computer programme and a vehicle.

The present invention provides a robust and reliable estimate of the soot load in the particle filter such as to minimise the influence of the accuracy and resolution of sensors used, and the influence of condensate in the particle filter, upon the estimate.

The method ensures reliability of soot load estimation by determining an appropriate time for doing a measurement of the differential pressure across the particle filter. The differential pressure measured at that time is then used in estimating the soot load in the filter. Choosing that time according to the invention avoids various problems and sources of error which have resulted in previous known estimates being unreliable. The time for measurement chosen well according to the invention also means that the resulting estimate of the soot load in the filter becomes fully effective for memory and calculation purposes.

Ensuring that the temperature of the particle filter is high enough for a long enough time before beginning to measure the pressure drop and estimate the soot load provides assurance that the filter is then substantially free from any water which was in the filter at the time when the vehicle was set in motion. Backpressure caused by any condensate accumulated in the filter since the vehicle was switched off is thus prevented from being added to the backpressure arising from the soot load at the time of estimation.

Ensuring that when the measurement of the pressure drop across the particle filter and hence also the estimate of the soot load are made, the exhaust volume flow exceeds a threshold value set high enough, affords assurance that the resolution of the pressure drop sensor is sufficient for achieving good accuracy of the measured flow value. In other words, the pressure drop across the filter at these high flows becomes large relative to the accuracy of the sensor. The result is that the signal from the sensor is only subject to errors which have relatively little effect on the estimate.

Ensuring that the temperature of the particle filter before the soot load is estimated, i.e. before measuring the pressure drop across the filter, exceeds a first threshold value which is higher than a temperature at which water in the exhaust gases might condense, avoids problems related to any recondensation of water such as may occur if the temperature drops temporarily during operation of the vehicle.

Estimation according to the present invention is therefore only done when all of these conditions are fulfilled, i.e. when the exhaust volume flow exceeds the flow threshold value, when the particle filter is substantially free from water and when the temperature exceeds the first temperature threshold value. The result is an estimate of the soot load which is more exact and more effective for memory and calculation purposes, since the majority of possible sources of error are eliminated by choosing according to the invention when to do the estimation.

Further characteristics of the present invention and advantages thereof are indicated by the detailed description set out below of embodiment examples and the attached drawings.

DETAILED DESCRIPTION OF PREFERRED EMBODIMENTS

Figure 1A:
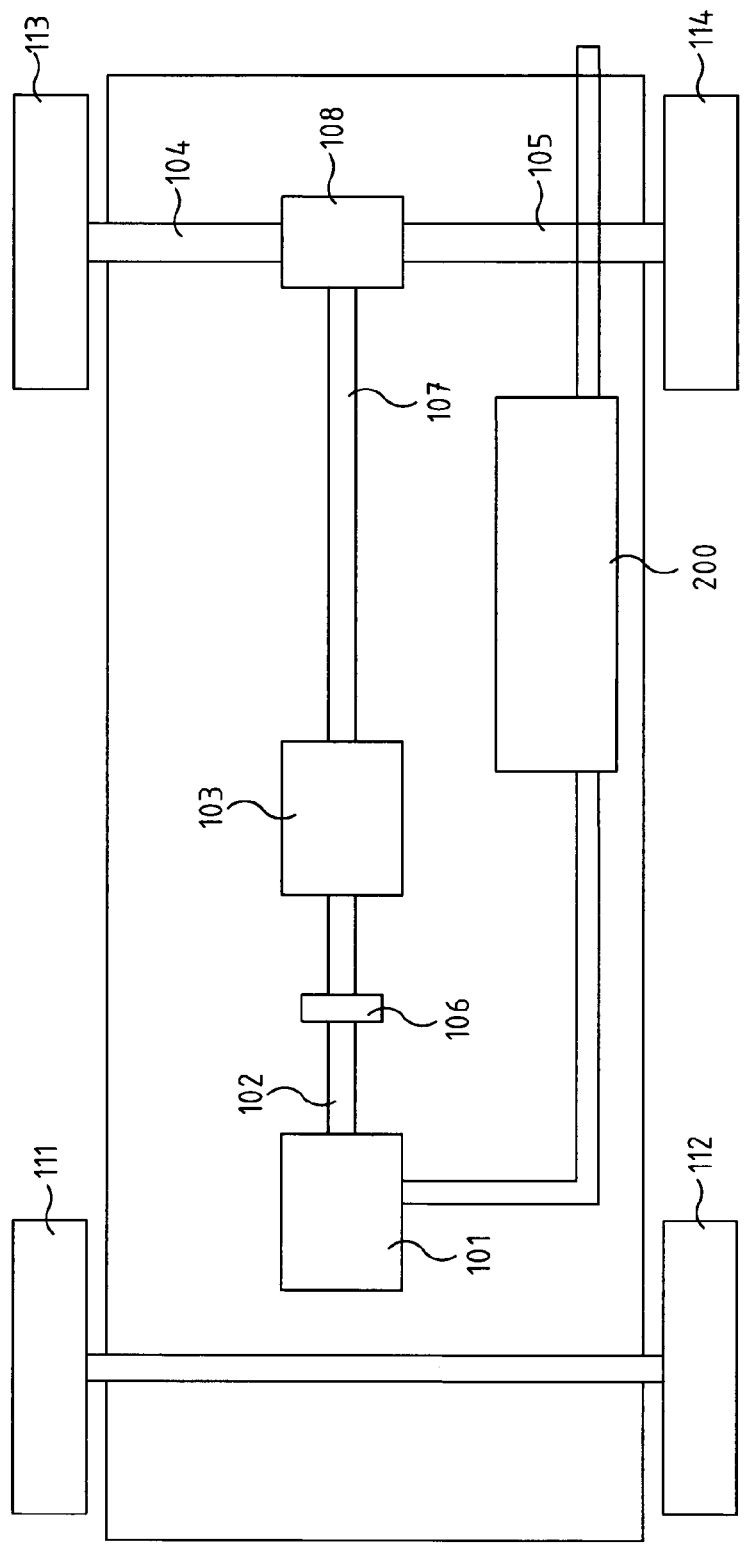
FIG. 1a depicts a power train of a vehicle in which the present invention may with advantage be used.

FIG. 1a depicts schematically a heavy vehicle 100, e.g. a truck, bus or the like, according to an example of an embodiment of the present invention. The vehicle 100 schematically depicted in FIG. 1a comprises a pair of forward wheels 111, 112 and a pair of powered rear wheels 113, 114. The vehicle further comprises a power train with a combustion engine 101 connected in a conventional way, by an output shaft 102 of the engine 101, to a gearbox 103, e.g. via a clutch 106.

An output shaft 107 from the gearbox 103 drives the powered wheels 113, 114 via a final gear 108, e.g. a conventional differential, and driveshafts 104, 105 which are connected to said final gear 108.

The vehicle 100 further comprises a post-treatment system/exhaust cleaning system 200 for treatment (cleaning) of exhaust discharges from the engine 101.

Figure 2:
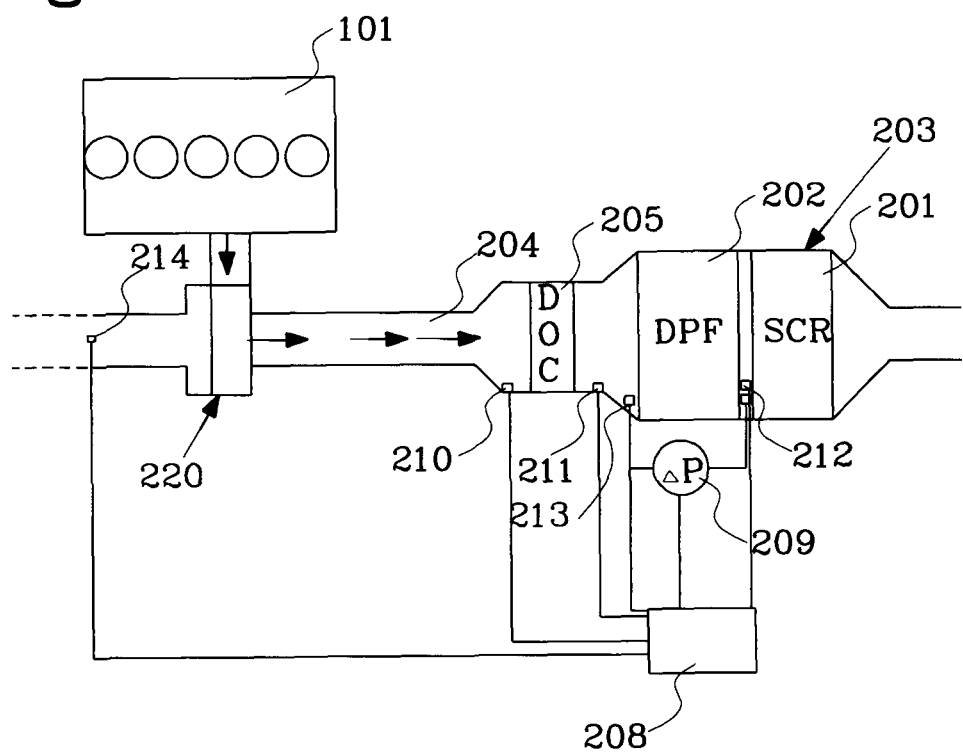
FIG. 2 depicts an example of a post-treatment system of a vehicle in which the present invention may with advantage be used.

The post-treatment system is depicted in more detail in FIG. 2. The diagram illustrates the engine 101 of the vehicle 100, in which the exhaust gases generated by the combustion are led via a turbo unit 220 (in turbo engines the exhaust flow arising from the combustion often drives a turbo unit used to compress the incoming air for the combustion in the cylinders). The function of turbo units is very well known and is therefore not described in more detail here. The exhaust flow is then led via a pipe 204 (indicated by arrows) to a particle filter 202 via an oxidation catalyst (diesel oxidation catalyst, DOC) 205.

The post-treatment system further comprises an SCR (selective catalytic reduction) catalyst 201 situated downstream of the particle filter 202 (diesel particulate filter, DPF). SCR catalysts use ammonia ($NH_3$), or a compound from which ammonia can be generated/formed, as additive for reducing the amount of nitrogen oxides $NO_x$.

The particle filter 202 may alternatively be situated downstream of the SCR catalyst 201, although this may be less advantageous in cases where the present invention relates to so-called passive regeneration which is dependent on the nitrogen oxides which are usually reduced by the SCR catalyst. According to an embodiment of the present invention, the post-treatment system does not comprise an SCR catalyst at all.

The oxidation catalyst DOC 205 has several functions and utilises the surplus air to which the diesel engine process generally gives rise in the exhaust flow as a chemical reagent in conjunction with a noble metal coating in the oxidation catalyst. The catalyst is normally used primarily to oxidise remaining hydrocarbons and carbon monoxide in the exhaust flow to carbon dioxide and water.

The oxidation catalyst may however also oxidise to nitrogen dioxide ($NO_2$) a large proportion of the nitrogen monoxides (NO) present in the exhaust flow. This nitrogen dioxide is then utilised in passive regeneration according to the present invention. Further reactions may also take place in the oxidation catalyst.

In the embodiment depicted of the exhaust cleaning system, DOC 205, DPF 202 and also the SCR catalyst 201 are integrated in a combined exhaust cleaning unit 203. It should however be noted that DOC 205 and DPF 202 need not be integrated in a combined exhaust cleaning unit but may instead be arranged in some other way found appropriate. For example, DOC 205 may be situated nearer to the engine 101. The SCR catalyst may likewise be separate from DPF 202 and/or DOC 205.

The exhaust cleaning system set-up depicted in FIG. 2 usually occurs in heavy vehicles, at least in jurisdictions where stringent emission requirements apply, but as an alternative to the oxidation catalyst the particle filter may instead be provided with noble metal coatings so that the chemical processes which would occur in the oxidation catalyst occur instead in the particle filter, and the exhaust cleaning system therefore has no DOC 205.

As previously mentioned, the combustion in the engine 101 results in the formation of soot particles. These soot particles need not, and are in many cases not allowed to, be discharged into the surroundings of the vehicle. Diesel particles consist of hydrocarbons, carbon (soot) and inorganic substances such as sulphur and ash. As mentioned above, these soot particles are therefore captured by the particle filter 202, which works in such a way that the exhaust flow is led through a filter structure in which soot particles are captured from the passing exhaust flow in order to be stored in the filter 202. A very large proportion of the particles may be separated from the exhaust flow by the filter.

The particles thus separated from the exhaust flow therefore accumulate in the filter 202, causing it to fill with soot over time. Depending on factors such as current driving conditions, the driver's mode of driving and the vehicle's load, a larger or smaller amount of soot particles will be generated, so this filling will take place more or less quickly, but when the filter reaches a certain level of filling it needs "emptying". If the filter is full to too high a level the vehicle's performance may be affected and there may also be fire hazards due to soot accumulation in combination with high temperatures.

As above, emptying the particle filter 202 is done by regeneration whereby soot particles, carbon particles, are converted in a chemical process to carbon dioxide and/or carbon monoxide. Over time the filter 202 has therefore to be regenerated at more or less regular intervals, and determining suitable times for its regeneration may for example be by means of a control unit 208 which may for example determine a suitable time or times at least partly on the basis of signals from a pressure sensor 209 which measures the differential pressure across the filter. The fuller the filter 202 becomes, the higher the pressure difference across it will be.

Determination of regeneration timing may also be affected by current temperatures before and/or after the oxidation catalyst 205 and/or before and/or after the filter 202. These temperatures may for example be determined by means of temperature sensors 210-212.

No regeneration action is normally taken so long as the filter's filling level remains below some predetermined level. For example, the control system's control of filter regeneration may be so arranged that no action is taken so long as the filter's degree of filling is for example below some suitable level within the range 60-80%. The degree of filling may be estimated in any suitable way, e.g. on the basis of differential pressure as above, in which case a certain pressure difference will represent a certain degree of filling.

The control unit 208 also controls the estimation of soot load according to the present invention, as described in more detail below.

Generally, control systems in modern vehicles usually comprise a communication bus system consisting of one or more communication buses for connecting together a number of electronic control units (ECUs), or controllers, and various components located on the vehicle. Such a control system may comprise a large number of control units, and the responsibility for a specific function may be divided among two or more of them.

For the sake of simplicity, FIG. 2 depicts only the control unit 208, but vehicles of the type depicted often have a relatively large number of control units, e.g. for control of engine, gearbox etc., as is well known to specialists within the technical field.

The present invention may therefore be implemented in the control unit 208 but may also be implemented wholly or partly in one or more other control units with which the vehicle is provided.

Control units of the type depicted are normally adapted to receiving sensor signals from various parts of the vehicle, e.g., as depicted in FIG. 2, said pressure sensor 209 and temperature sensors 210-212, and also, for example, an engine control unit (not depicted). The control signals generated by control units normally depend also both on signals from other control units and on signals from components. For example, the control exercised by the control unit 208 over regeneration according to the present invention may for example depend on information received for example from the engine control unit and the temperature/pressure sensors depicted in FIG. 2.

Control units of the type depicted are also usually adapted to delivering control signals to various parts and components of the vehicle, e.g. in the present example to the engine control unit to demand/order control of the engine's combustion as below.

The control is often governed by programmed instructions. These instructions take typically the form of a computer programme which, when executed in a computer or control unit, causes the computer/control unit to effect desired forms of control action, e.g. method steps according to the present invention. The computer programme usually takes the form of a computer programme product 109 which is stored on a digital storage medium 121 (see FIG. 1b), e.g. ROM (read-only memory), PROM (programmable read-only memory), EPROM (erasable PROM), flash memory, EEPROM (electrically erasable PROM), a hard disc unit etc., in or connected to the control unit, and which is executed by the control unit. The vehicle's behaviour in a specific situation may thus be adjusted by altering the computer programme's instructions.

Figure 1B:
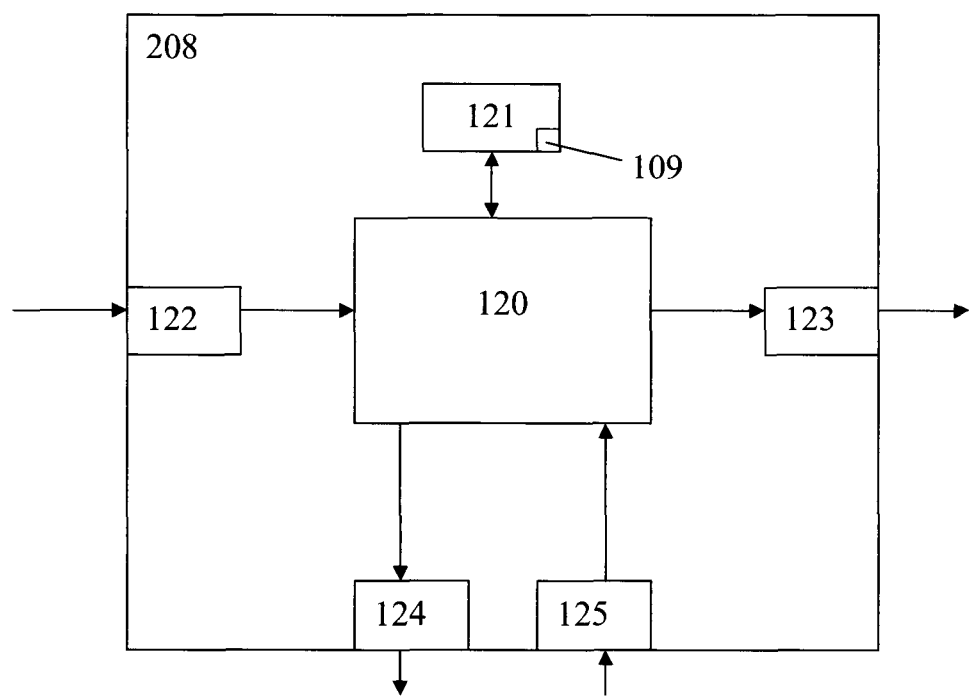
FIG. 1b depicts an example of a control unit in a vehicle control system.

An example of a control unit (the control unit 208) is depicted schematically in FIG. 1b, which control unit 208 may itself comprise a calculation unit 120 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit 121 which provides it with, for example, the stored programme code 109 and/or the stored data which the calculation unit 120 needs for it to be able to perform calculations. The calculation unit 120 is also arranged to store partial or final results of calculations in the memory unit 121.

The control unit 208 is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 120 can process.

These signals are thereafter conveyed to the calculation unit 120. The output signal sending devices 123, 124 are arranged to convert signals received from the calculation unit 120 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, a MOST (Media Orientated Systems Transport) bus or some other bus configuration, or a wireless connection.

As above, regeneration may in principle be effected in two different ways. One way is by so-called oxygen ($O_2$) based regeneration, also called active regeneration. In active regeneration a chemical process takes place substantially as follows:

$$C+O_2=CO_2+\text{heat} \qquad (\text{eq. 1})$$

Active regeneration thus converts carbon plus oxygen gas to carbon dioxide plus heat. However, this chemical reaction is very temperature-dependent and requires relatively high filter temperatures for acceptable reaction rates to be achieved at all. A lowest filter temperature of 500° C. is typically required, but a still higher temperature is preferable for regeneration to take place at desired rates.

However, the maximum temperature usable in active regeneration is often limited by tolerances of the components concerned. For example, the particle filter 202 and/or any downstream SCR catalyst often have design limitations with regard to the maximum temperature to which components may be subjected. This means that active regeneration may, owing to components affected, be subject to an unacceptably low maximum permissible temperature. At the same time, a very high lowest temperature is therefore required for any usable reaction rate to be achieved at all. In active regeneration, the soot load in the filter 202 is normally burnt substantially completely. After total regeneration of the filter, its soot level will be substantially 0%.

It is now increasingly common that vehicles are equipped not only with particle filters 202 but also with SCR catalysts 201, in which case active regeneration may entail problems in the form of overheating of the downstream SCR catalyst treatment process.

At least partly for this reason, the present invention applies $NO_2$ based (passive) regeneration instead of the active regeneration described above. In passive regeneration, nitrogen oxides and carbon oxides are formed in a reaction between carbon and nitrogen dioxide as follows:

$$NO_2+C=NO+CO \quad \text{(eq. 2)}$$

The advantage of passive regeneration is that desired reaction rates, and hence the rate at which the filter is emptied, are achieved at lower temperatures. Passive regeneration of particle filters typically takes place at temperatures within the range 200° C.-500° C., although temperatures in the upper part of this range are normally preferable. This substantially lower temperature range than in active regeneration is nevertheless a great advantage in cases where, for example, there are SCR catalysts, since it entails no risk of reaching such a high temperature level as to cause risk of damage to the SCR catalyst.

As described above, the differential pressure across the particle filter 202 is determined by means of the differential pressure sensor 209. The differential pressure is then used to estimate the soot load in the filter 202. Previous known solutions assume that the differential pressure follows a curve of a soot load which is a function of the volume flow through the filter.

Figure 3:
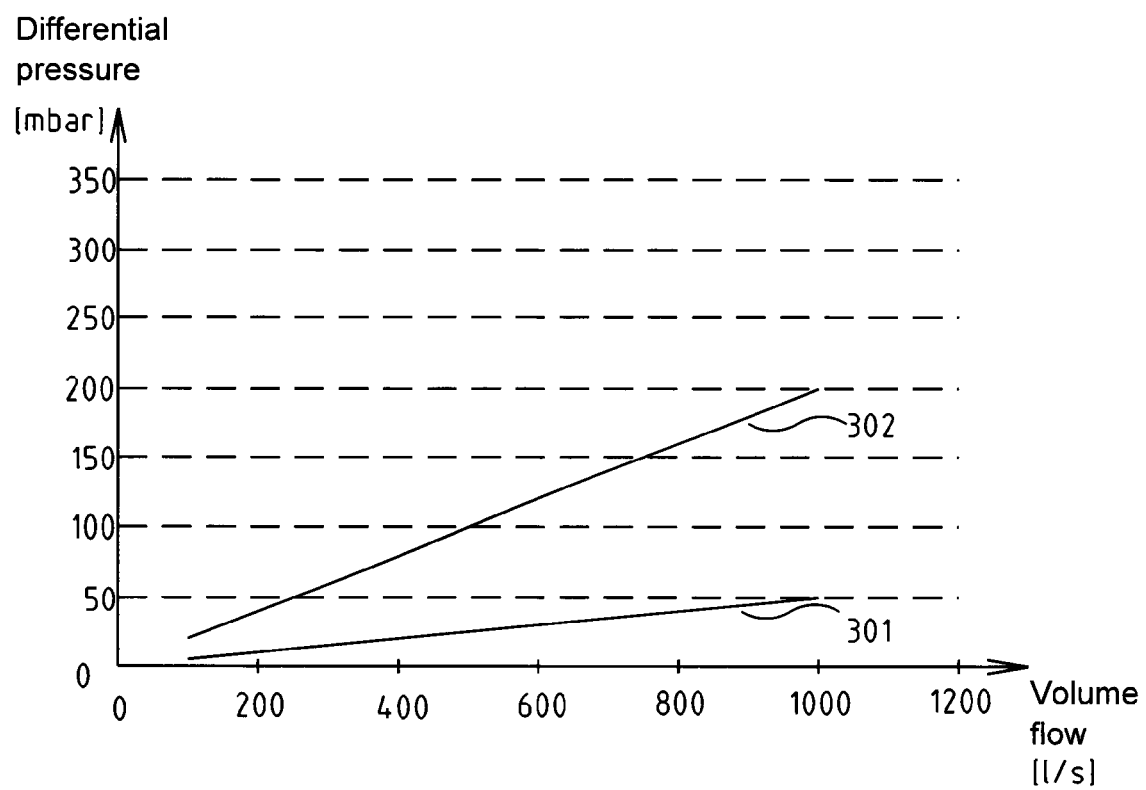
FIG. 3 depicts differential pressure as a function of the volume flow through the particle filter for two different soot loads.

Two examples of such curves appear in FIG. 3, showing the differential pressure across the particle filter as a function of the volume flow at various soot loads in a filter which is substantially free from water. The lower curve 301 represents here the differential pressure across the same substrate in the filter, i.e. the differential pressure when the filter is free from soot, meaning 0 g/l of soot. The upper curve 302 represents the differential pressure across the filter when it contains stored soot. In this example the filter here contains 5 g/l soot.

Curves such as those in FIG. 3 have previously been relied upon in determining soot loads in the particle filter, but this approximation of the relationship of differential pressure, soot load and volume flow does not result in reliable values for the soot load, for several reasons.

One problem with the approximation is that the use of sensors entails inherent inaccuracies and also individual scatters, making it difficult to achieve an exact measure of where on the respective curve the system is at the time. This does of course result in difficulties in exactly determining the soot load in the particle filter 202 on the basis of the respective curve.

Moreover, condensate accumulates in the porous structure of the filter when the exhaust cleaning system is inactive and cool. Condensate in the filter has previously been a source of inexact estimates of the soot load, since condensate also causes backpressure in the filter.

A further problem of this approximation is that it may be complicated to estimate how much recondensation of water from the exhaust gases occurs during operation of the vehicle if their temperature drops temporarily, contributing to errors in previous known estimates of soot load.

According to the present invention, the problems indicated above are solved by determining an appropriate time for measuring the pressure drop across the particle filter 202 and using the pressure drop at that specific time to estimate the soot load in the filter. According to the invention, the measurement and therefore the estimate are made when the exhaust volume flow exceeds a threshold value, when the particle filter is substantially free from water and when the temperature of the filter exceeds a first threshold value. The estimate is therefore only made when all of these conditions are fulfilled.

As the exhaust volume flow according to the present invention exceeds a threshold value, the differential pressure at the time of estimation will be large relative to the accuracy of the differential pressure sensor 209, resulting in a more exact measurement. If as in previous known solutions there is no assurance that the exhaust volume flow will exceed a threshold value, the differential pressure may well not be large relative to the accuracy of the sensor, potentially resulting in erroneous soot load estimates. According to previous known solutions the differential pressure may therefore be so small at the time of estimation that the accuracy of the sensor may constitute a substantial source of error.

As according to the present invention the measurement and therefore the estimate are made when the particle filter 202 is free from condensate, the result is a soot load value which more exact and is not influenced by backpressure caused by condensate which was in the filter at the time when the vehicle was started up.

As according to the present invention the measurement and therefore the estimate are made at a time when the temperature of the filter exceeds a first threshold value, the influence of any recondensation of water in the pores of the filter when the temperature temporarily drops during operation of the vehicle is reduced. The result is a more exact value for the differential pressure at a given exhaust volume flow and flow resistance.

To sum up, applying the present invention results in a soot load estimate substantially free from adverse influences due to accuracy of sensors, condensate present in varying amounts in the particle filter at start-up, or any condensation of water during operation of the vehicle due to the temperature of the exhaust gases temporarily dropping below the level at which water in them might recondense in the filter 202.

According to an embodiment of the present invention, a magnitude is determined for the exhaust volume flow on the basis of an exhaust mass flow through the exhaust cleaning system 200, a pressure upstream from the particle filter 202 and a temperature of the filter.

There are various ways of calculating the exhaust mass flow. It may for example be calculated on the basis of a signal from a mass flow sensor 214 situated at the inlet to the engine 101 and connected the control unit 208. The exhaust mass flow may also for example be calculated on the basis of pressure and temperature at the engine's inlet cowl, subject to compensation for any use of EGR (exhaust gas recirculation) valves.

The pressure upstream from the particle filter 202 may be determined by means of a pressure signal from a pressure sensor 213, relative to atmospheric pressure, which sensor will be situated upstream from the particle filter 202 and be connected to the control unit 208. The temperature of the particle filter may be estimated on the basis of a temperature signal from at least one temperature sensor 211, 212 for said filter, which may be situated near to the filter, either upstream 211 or downstream 212 from it.

The flow threshold value which has according to the invention to be exceeded before estimation of the soot load is undertaken needs to be set at a value high enough to ensure accuracy of said pressure sensor, which those skilled in the art will appreciate is different for different sensors. Typically this flow threshold value may correspond to a flow within the range 200 to 300 liters per second. According to an embodiment of the invention, this flow threshold value corresponds to a flow of about 250 liters per second. This affords assurance that using pressure sensors results in reliable output signals.

As described above, condensate often accumulates in the particle filter 202, potentially resulting in backpressure which is indistinguishable from soot load and therefore results in erroneous estimation of the soot load.

According to the present invention, the particle filter 202 is regarded as substantially free from water if it has for a long enough time maintained a temperature above a certain threshold value which is high enough to remove water from it.

According to an embodiment of the present invention, a water content in the particle filter 202 is determined by means of a model which takes the characteristics of the water into account in such a way that it regards the filter as substantially free from water if it has for at least a predetermined time been at a temperature above a second threshold value. At low temperatures of the particle filter, e.g. when the vehicle is idling, water may still condense in the filter. This second threshold value therefore exceeds with advantage a temperature at which water boils away out of the pores of a particle filter.

The second temperature threshold value is therefore within the range 150-250° C. According to an embodiment of the invention, the second threshold value is about 200° C. This means that if the particle filter maintains a temperature within this range, any water present will be removed from it.

According to an embodiment of the present invention, the predetermined time during which the filter has according to the model to maintain a temperature within the range 150-250° C. is between 8 and 12 minutes. According to an embodiment of the invention, this predetermined time is about 10 minutes.

By thus maintaining for a long enough time a temperature high enough to remove water from it, the present invention affords assurance that the filter 202 will be substantially free from water. The result is a more exact estimate of the soot load, since substantially no backpressure due to condensate is added to the backpressure due to the soot load.

As indicated above, condensate increases the backpressure across the particle filter 202. Once the filter has warmed up, it is desired to avoid estimating the soot load at a time when condensation of water may well have again taken place, which might happen if for example the temperature of the exhaust gases drops temporarily. According to the invention, measuring the pressure drop and estimating the soot load are therefore only done after the filter has reached a first temperature threshold which is higher than a temperature at which water might condense out of the exhaust gases in the filter. This first threshold value may be between 140 and 200° C. According to an embodiment of the invention, this first threshold value is about 170° C. Making estimates only when such a high temperature has been reached makes it possible to avoid erroneous soot load estimation due to accumulation of water in the pores of the filter.

As described above, estimating the soot load involves using an exhaust mass flow determined on the basis of an exhaust mass flow signal, a pressure signal from a pressure sensor 213, relative to atmospheric pressure, and a temperature signal from a temperature sensor 211, 212 for the particle filter 202. The exhaust mass flow and the temperature have different time lags, which means that corresponding signals have different mutual time lags. Moreover, these signals also time-lag relative to the signal from the pressure sensor 213. These time lags result in the signal for soot load estimation becoming very straggly, jerky and difficult to interpret. The signal becomes quite simply difficult to interpret because of its jagged appearance, with consequent risk of misinterpretation.

According to an embodiment of the invention, the signal corresponding to the estimate of the soot load is therefore filtered. This filtration is preferably by means of a low-pass filter which smoothes out the straggliness of the signal. The appearance of this signal after the filtration therefore makes it easier to understand and interpret.

Figure 4:
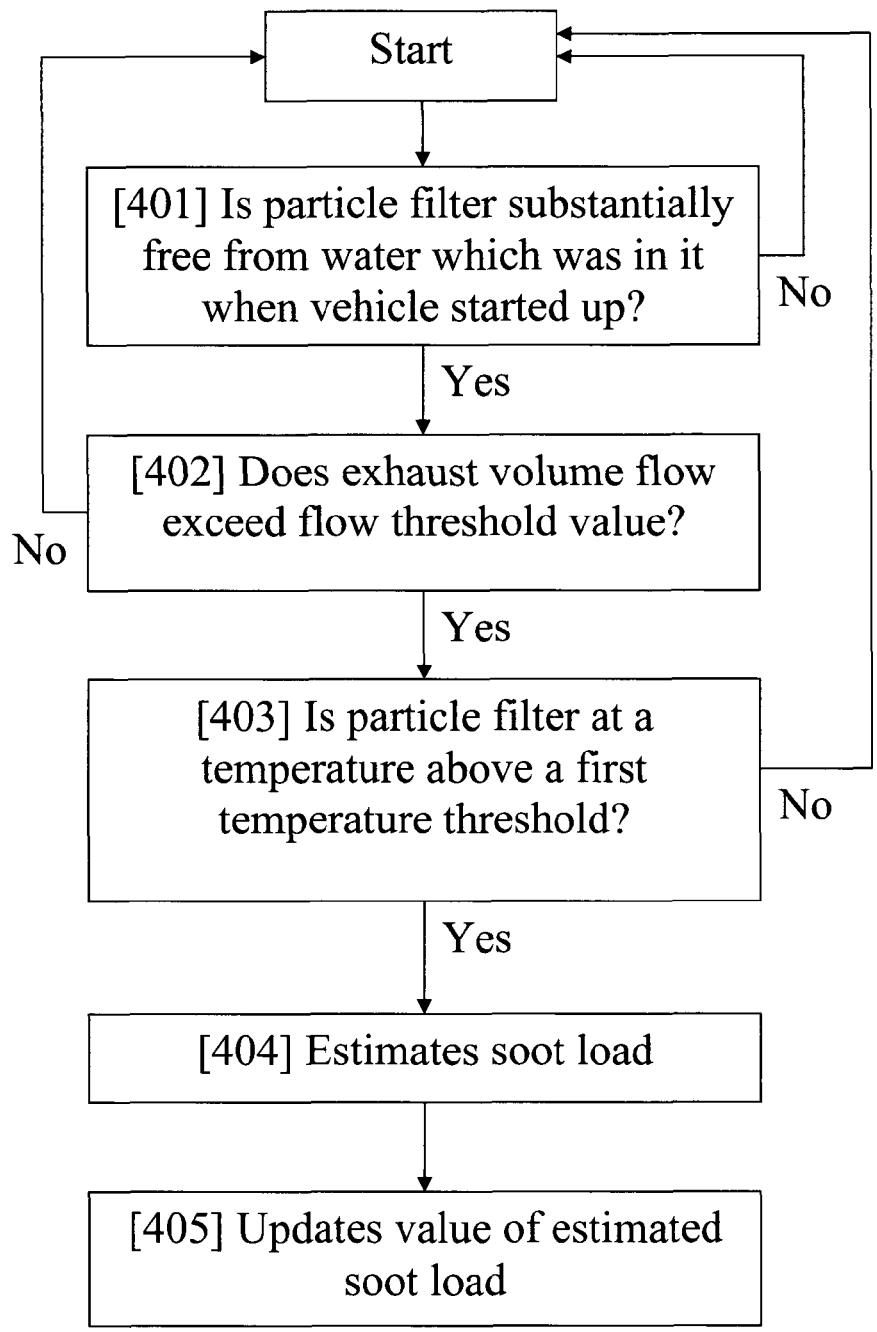
FIG. 4 is a flowchart for a method according to the invention.

FIG. 4 is a flowchart for the method according to the present invention. A first step 401 after the start of the method checks, preferably by using the model described above for condensate, whether the particle filter is substantially free from any water which may have been in it when the vehicle started up. If the filter is found substantially free from water, the method moves on to a second step 402. If the filter is not free from water, the method starts again from the beginning.

The second step 402 checks whether the exhaust mass flow exceeds the flow threshold value, in which case the method moves on to a third step 403. If the exhaust mass flow does not exceed the threshold value, the method starts again.

The third step 403 checks whether the particle filter is above a first temperature threshold. If the temperature is higher than this threshold, the method moves on to a fourth step 404. If the temperature is lower than the threshold, the method starts again from the beginning.

As one skilled in the art will appreciate, the first three steps 401, 402, 403 according to the method may be conducted in substantially any desired order. It is also possible to implement the method such that any condition at a given step which is not fulfilled is checked a further number of times before the method starts again from the beginning.

What is essential according to the method is that before it reaches the fourth step 404 the exhaust mass flow has to exceed its threshold value and the particle filter has to be substantially free from water and be at a temperature above its threshold value.

The fourth step 404 of the method estimates the soot load, i.e. it measures the pressure drop and estimates the soot load. The fact that all of the conditions at the first, second and third steps 401, 402 and 403 are fulfilled before the fourth step 404 can take place provides assurance of a robust and reliable estimate of the soot load.

A fifth step 405 of the method updates a previous specific value for the estimate of the soot load. A new specific value for the current soot load will thus be written over the old saved value.

The present invention relates also to a system adapted to estimation of the soot load in a particle filter 202. The system according to the invention comprises flow means adapted to determining whether an exhaust mass flow exceeds a flow threshold value. The system comprises also water presence determination means adapted to determining water present in the particle filter, and temperature means adapted to estimating a temperature of the particle filter 202. The system comprises also estimation means adapted to estimating the soot load of the particle filter 202 when the exhaust mass flow exceeds a flow threshold value, the filter is substantially free from water and the filter's temperature exceeds a first threshold value.

The system is further arranged to comprise means for effecting the various embodiments described above of the method according to the invention.

The invention further relates to a vehicle according to FIG. 1a, comprising a particle filter 202 and a system according to the invention which is adapted to making an estimate of soot load in the filter by the method according to the invention.

The present invention is exemplified above in relation to vehicles. The invention is nevertheless also applicable to any means of transport in which exhaust cleaning systems as above are applicable, e.g. in watercraft or aircraft with combustion processes/regeneration processes as above.

The invention claimed is:

1. A method for estimation of a soot load in a particle filter in an exhaust cleaning system, comprising:
measuring a pressure drop across said particle filter to determine said soot load in said filter, wherein said estimation is based on said measuring of said pressure drop at a specific time when an exhaust volume flow of said exhaust cleaning system exceeds a flow threshold value;
determining whether said particle filter has for a sufficient period of time maintained a temperature above a second temperature threshold value which is high enough and for a sufficient period of time to remove water from said particle filter, so that said filter is substantially free from water; and
determining whether a temperature of said particle filter exceeds a first threshold value which is higher than a temperature at which water in exhaust gases in said exhaust cleaning system can condense.

2. A method according to claim 1, further comprising determining a magnitude of said exhaust volume flow based on an exhaust volume mass flow of said exhaust cleaning system, a pressure upstream of said exhaust volume from said particle filter and a temperature of said particle filter.

3. A method according to claim 2, further comprising:
determining said pressure by means of a pressure sensor situated upstream in said exhaust volume flow from said particle filter; and
setting said flow threshold value at a high enough value selected to provide accuracy of said pressure sensor.

4. A method according to claim 3, wherein said flow threshold value corresponds to a flow of between 200 and 300 liters per second.

5. A method according to claim 4, wherein said flow threshold value corresponds to a flow of about 250 liters per second.

6. A method according to claim 1, further comprising determining whether said filter is substantially free from water by determining a water content in said particle filter by means of a model.

7. A method according to claim 6, wherein according to said model, said particle filter is substantially free from water if it has for at least a predetermined time been at a temperature above said second temperature threshold value.

8. A method according to claim 7, wherein said second threshold value exceeds a temperature at which water boils away out of pores in said particle filter.

9. A method according to claim 8, wherein said second threshold value corresponds to a temperature within the range 150-250° C.

10. A method according to claim 8, wherein said second threshold value corresponds to a temperature of about 200° C.

11. A method according to claim 7, wherein said predetermined time corresponds to a period of between 8 and 12 minutes.

12. A method according to claim 7, wherein said predetermined time corresponds to a period of about 10 minutes.

13. A method according to claim 1, wherein said first temperature threshold value depends on a temperature of said exhaust gases.

14. A method according to claim 13, wherein said first temperature threshold value corresponds to a temperature of between 140 and 200° C.

15. A method according to claim 13, wherein said first threshold value corresponds to a temperature of about 170° C.

16. A method according to claim 1, wherein when a value for said estimate is determined at said time, updating a previous value determined for said estimate is updated.

17. A method according to claim 1, wherein a signal corresponding to said estimate is filtered.

18. A system configured for estimating a soot load in a particle filter in an exhaust cleaning system, wherein the estimation uses a pressure drop across said particle filter to determine said soot load, said system comprising:
a flow determining device configured to determine whether an exhaust volume flow of said exhaust cleaning system exceeds a flow threshold value;
a water presence determining device configured to determine if said particle filter is substantially free from water if said particle filter has for a sufficient period of time maintained a temperature above a second threshold value which is high enough to remove water from said particle filter;
a temperature estimating device configured to estimate a temperature of said particle filter; and
an estimator device configured for effecting said soot load estimation on the basis of a measurement of said pressure drop made at a specific time when said exhaust mass volume flow exceeds a flow threshold value, said particle filter is substantially free from water and said temperature of said particle filter exceeds a first threshold value which is higher than a temperature at which water in exhaust gases in said exhaust cleaning system can condense.

19. A vehicle comprising:
a particle filter; and
a system for estimating a soot load in said particle filter according to claim 18.

20. A computer program product pertaining to a system for estimating a soot load in a particle filter wherein said program product comprises a non-transitory computer-readable medium and a computer program stored on said medium; said computer program comprising program code with program instructions for causing a computer to cause performance of the steps of the method according to claim 1.

21. The computer program product of claim 20, wherein said program code is contained in said medium which takes the form of any from among ROM (read-only memory), PROM (programmable ROM), EPROM (erasable PROM), flash-memory, EEPROM (electrically EPROM) and hard disc unit.

22. The method of claim 1, wherein said temperature of said particle filter is determined by at least one temperature sensor positioned proximal to said particle filter configured to measure the temperature of said particle filter.

* * * * *